United States Patent [19]
Thompson et al.

[11] 4,076,132
[45] Feb. 28, 1978

[54] BOBBIN TRANSPORTING AND STORAGE SYSTEM

[75] Inventors: Walter F. Thompson; Dennis M. Redo, both of Somerville, N.J.

[73] Assignee: General Cable Corporation, Greenwich, Conn.

[21] Appl. No.: 626,371

[22] Filed: Oct. 28, 1975

[51] Int. Cl.² .............................................. B65G 1/08
[52] U.S. Cl. .................................. 214/16.4 A; 57/53; 214/16.4 C; 242/35.5 A
[58] Field of Search ...................... 214/16.4 R, 16.4 C, 214/16.4 A; 242/35.5 R, 35.5 A; 29/755; 57/52, 53

[56] References Cited

U.S. PATENT DOCUMENTS

| | | | |
|---|---|---|---|
| 2,020,552 | 11/1935 | Hills | 214/16.4 R |
| 2,307,325 | 1/1943 | Gray | 242/35.5 R |
| 2,755,950 | 7/1956 | Forshey | 214/16.4 C |
| 2,788,179 | 4/1957 | Hafer et al. | 242/35.5 R |
| 3,157,296 | 11/1964 | Oldham | 214/16.4 A |
| 3,348,785 | 6/1962 | Cocker | 214/16.4 R |
| 3,392,854 | 7/1968 | Yamashita | 214/16.4 R |
| 3,608,293 | 9/1971 | Brouwer | 252/35.5 R |
| 3,800,963 | 4/1974 | Holland | 214/16.4 C |
| 3,817,406 | 6/1974 | Sawada et al. | 214/16.4 C |
| 3,863,778 | 2/1975 | Martin | 214/16.4 R |

FOREIGN PATENT DOCUMENTS 2,263,330   7/1973   Germany ........................ 214/16.4 R

OTHER PUBLICATIONS

Modern Materials Handling, excerpt from, June 1962 article.

Primary Examiner—Robert J. Spar
Assistant Examiner—Carl Rowold
Attorney, Agent, or Firm—Roy C. Hopgood; John M. Calimafde; Charles W. Neill

[57] ABSTRACT

This invention is a wire and transport system for a communication cable manufacturing facility. Bobbins wound with insulated wire roll down a bobbin track from a location where the wires are drawn and covered with a layer of insulation. A number of full bobbins accumulate on the track, and they are transferred to an elevator that delivers them to a multi-layer inventory storage rack. Final alignment of the elevator with the tracks and compartments of the inventory storage rack is under the control of electronic apparatus; but the positioning of the elevator in the vicinity of the selected track or storage compartment is controlled by an operator who rides on a carriage on which the elevator shaft is mounted.

22 Claims, 8 Drawing Figures

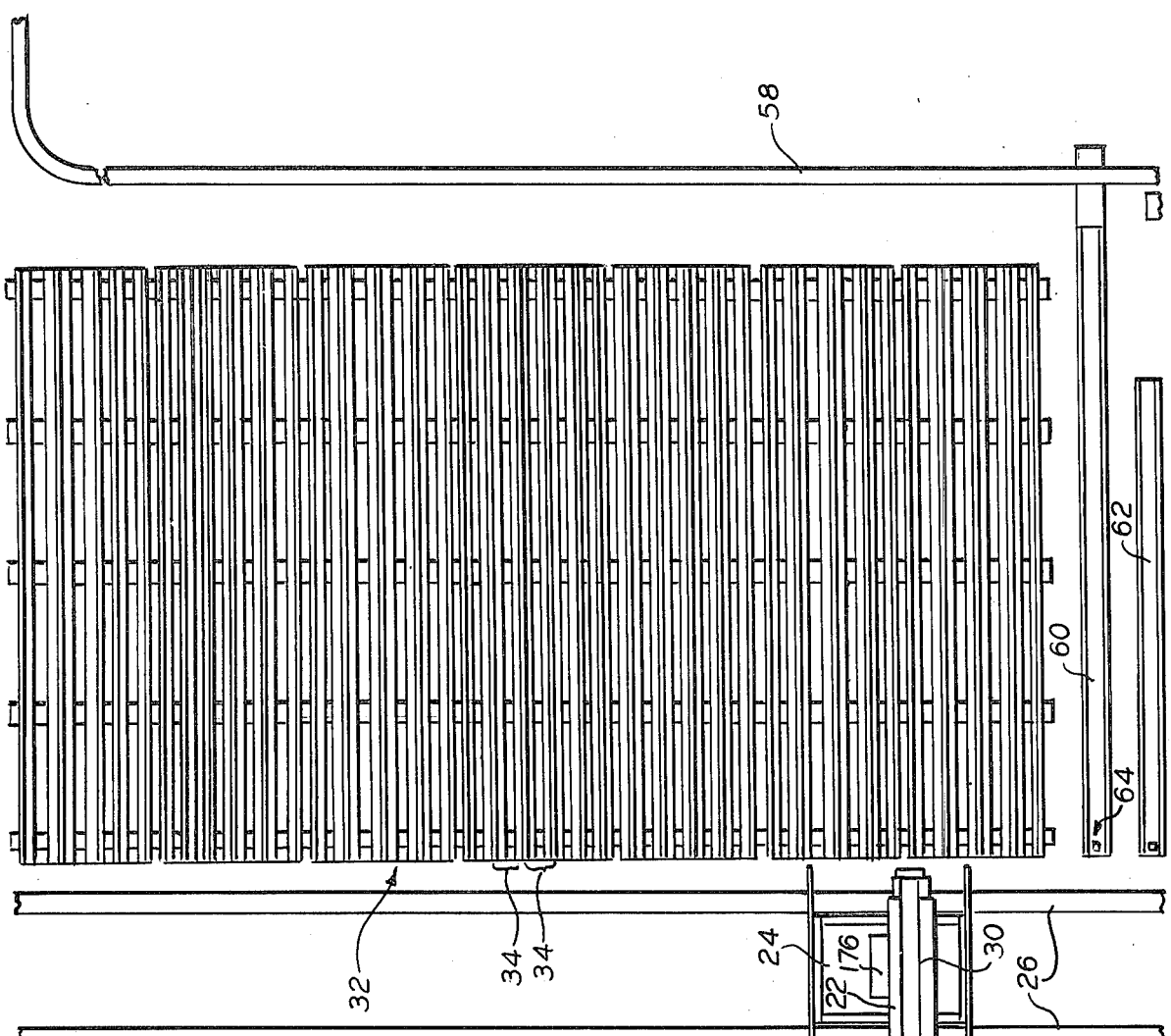
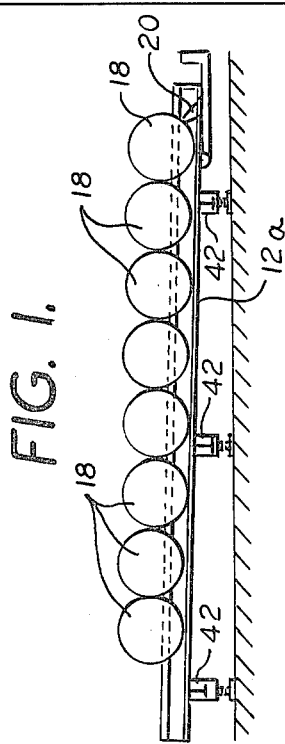
FIG. 1.
FIG. 2.

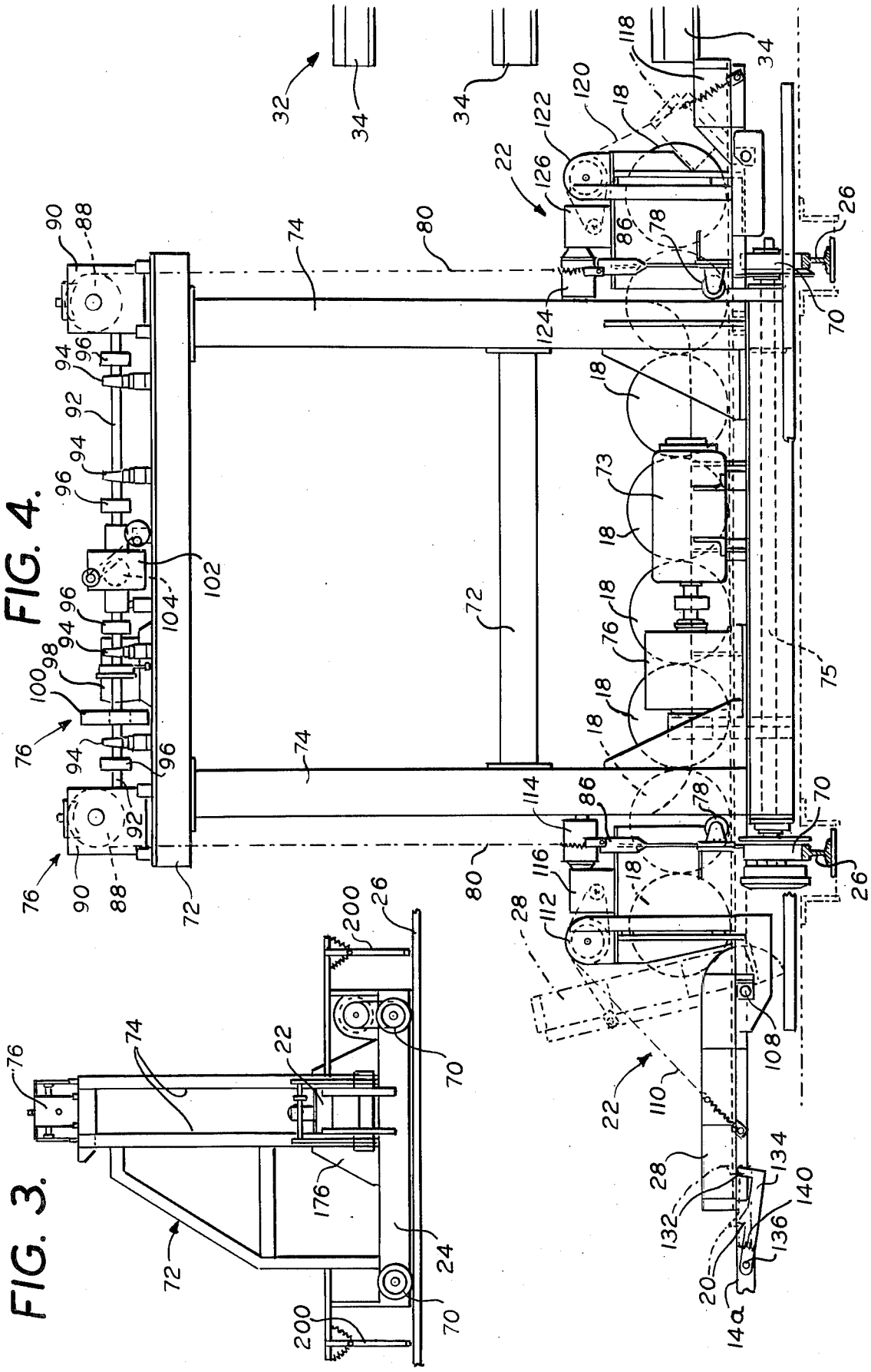

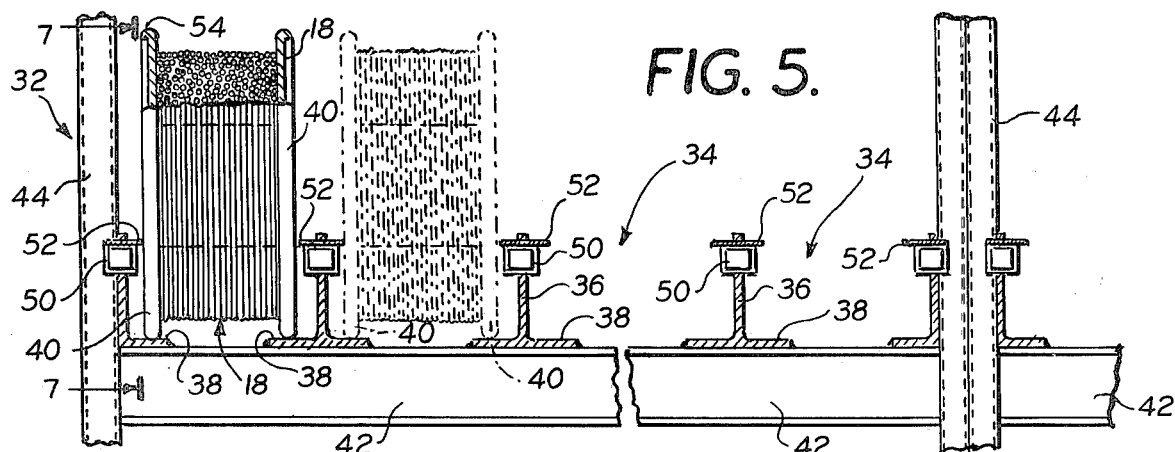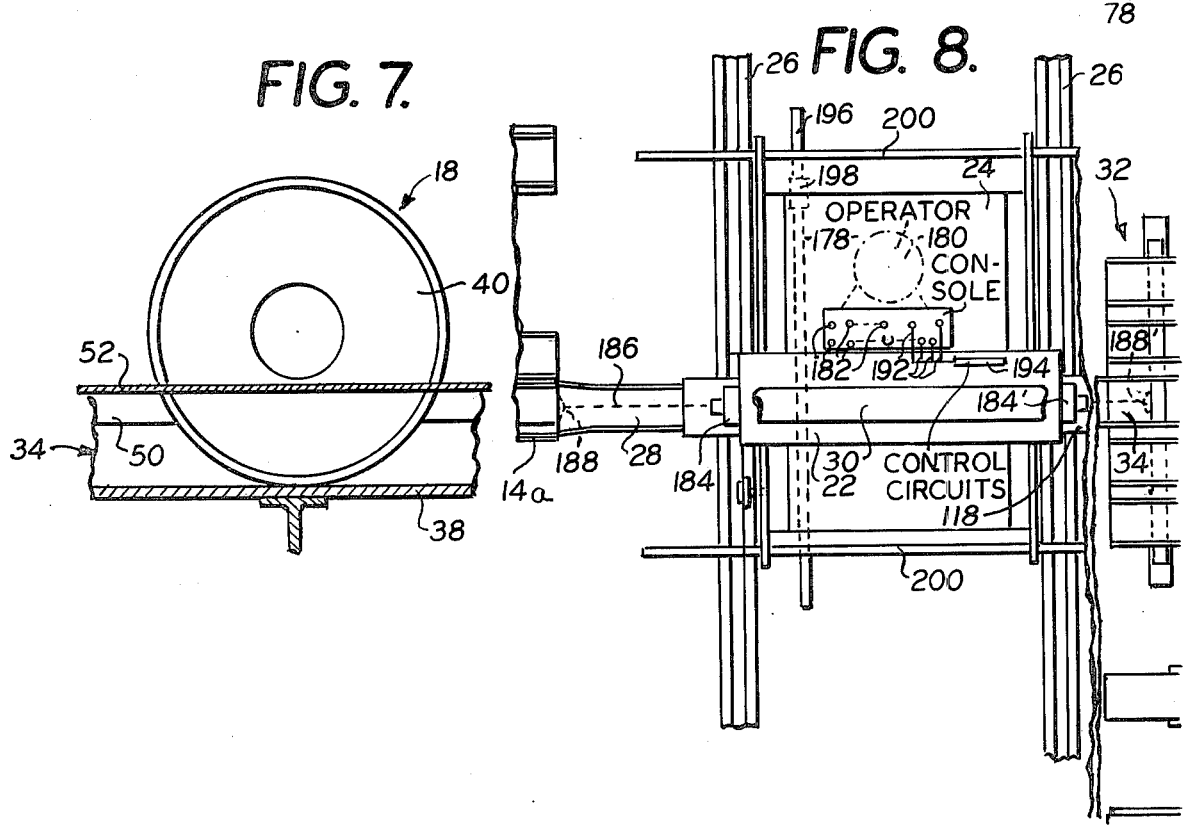

BOBBIN TRANSPORTING AND STORAGE SYSTEM

BACKGROUND AND SUMMARY OF THE INVENTION

This invention provides for the movement of wire and bobbins, and more especially groups of wire and bobbins between different locations in a plant that manufactures communication cables. The invention eliminates manual handling of the bobbins and eliminates the use of manually operated cranes that move bobbins into position for storage or for delivery to a pairing station of a cable manufacturing plant.

The invention eliminates the necessity for a substantial part of the manual labor in a cable making plant; and more importantly, it eliminates damage to bobbins and the wire they carry resulting from improper manual handling of the bobbins and from misalignment of crane facilities with compartments of storage racks or other locations where a crane has heretofore been used to receive or deliver bobbins to other apparatus.

The invention includes a bobbin track that slopes downwardly toward a carriage track extending at right angles to the bobbin track along which a carriage runs which supports an elevator and elevator shaft. Chutes on opposite sides of the elevator can be lowered into positions to form extensions of the bobbin track. Bobbins accumulated on the bobbin track roll by gravity into the elevator which has another track for holding a full complement of bobbins from the first bobbin track.

The carriage moves the elevator, with the bobbins thereon, into alignment with compartments of an inventory storage rack which has compartments at different levels, and the elevator raises the bobbins into alignment with the particular compartment of the storage rack in which they are to be stored. The slope of the bobbin track on the elevator permits the bobbins to roll by gravity into the compartment of the storage rack.

The invention includes correlations of the combined parts of the transport system and provision by which an operator riding on the carriage at a control console can bring the elevator into the vicinity of a location at which it is to be aligned with bobbin tracks, and electronic controls take over from the manually operated controls to effect the final alignment of the carriage and elevator with the tracks to or from which bobbins are to be transferred.

Other objects, features and advantages of the invention will appear or be pointed out as the description proceeds.

BRIEF DESCRIPTION OF DRAWING

In the drawing forming a part hereof, in which like reference characters indicate corresponding parts in all the views:

FIG. 1 is a diagrammatic side elevation of the bobbin track shown in FIG. 2;

FIG. 2 is a diagrammatic top plan view of a communication cable manufacturing facility equipped with the bobbin transport system of this invention;

FIG. 3 is a greatly enlarged, diagrammatic view showing the carriage of FIG. 2 in side elevation;

FIG. 4 is a greatly enlarged elevation of the carriage shown in FIG. 3, the view being taken at right angles to the view of FIG. 3;

FIG. 5 is a greatly enlarged, fragmentary view of the bobbin tracks of the inventory storage rack which is shown in plan view in FIG. 2, one of the bobbins being shown partly in section;

FIG. 6 is an enlarged top plan view of a portion of the elevator which is shown in FIG. 4;

FIG. 7 is a view taken on the section line 7—7 of FIG. 3 but showing the bobbin in elevation; and FIG. 8 is a diagrammatic top plan view of the elevator showing the controls.

DESCRIPTION OF PREFERRED EMBODIMENT

FIG. 2 shows a part of a communication cable manufacturing facility in which a wire making section of the plant is indicated by the reference character 10. Individual characters insulated with insulation of different colors are supplied from different wire making apparatus designated by the reference characters 12, 14 and 16. Each of the wire making apparatus 12, 14 and 16 preferably operates independently of the others and the number of wire making apparatus depends upon the capacity of the plant. Wire made by the apparatus 12 is wound on bobbins which are delivered to a first bobbin track 12a. Bobbins of wire made by the apparatus 14 and 16 is delivered to first bobbin tracks 14a and 16a respectively.

As more bobbins are wound they are delivered to and accummulate in line on the first tracks 12a, 14a and 16a. The bobbins are not shown in FIG. 2 because of the small scale; but FIG. 1 shows a side elevation of the bobbin track 12a with a plurality of bobbins 18 accummulated thereon. There is an abutment or stop 20 at the right hand end of the track 12a for preventing the end bobbin 18 from rolling off the track. There is sufficient slope to the track 12a so that bobbins 18 roll down the track and off the end of the track to an elevator when the stop 20 is moved into an inoperative position. This will be described more fully in connection with other figures of the drawing.

An elevator 22 is supported on a carriage 24 which moves back and forth along a track 26 which runs at right angles to the bobbin tracks 12a, 14a and 16a. The elevator 22 is in an elevator shaft supported by the carriage 24. The diagrammatic showing in FIG. 2 does not show the elevator shaft but it will be shown and described in connection with the Figures of larger scale. For the present, it is sufficient to understand that the carriage 24 travels along the track 26 and brings the elevator 22 into alignment with any one of the individual bobbin tracks 12a, 14a and 16a. It is shown in alignment with the track 14a in FIG. 1. A chute 28 is pivoted to the elevator in such a way that it can move into a position to form a continuation of the bobbin track 14a when bobbins from that track are to be rolled onto an elevator track which is similar to the bobbin track 14a and which preferably holds the same number of bobbins. This makes it possible for the elevator to take all of the stored bobbins from the bobbin track 14a, or any other bobbin track, and transport them all at one time to an inventory storage rack 32.

This storage rack 32 has a plurality of separate compartments 34, two of which are designated by reference characters in FIG. 2. Each compartment 34 has a track for supporting bobbins which are delivered to the compartment from the elevator 22.

FIG. 5 shows a portion of the inventory storage rack 32 on a substantially larger scale than FIG. 2. The compartments 34 are formed by rails 36 having bottom flanges 38 on which flanges 40 bobbins 18 roll.

The rails 36 are supported at spaced locations along beams 42 which are attached at their opposite ends to columns 44 by welding, or in any other suitable manner.

The storage rack 32 is of multi-layer construction and preferably has four layers, each supported by its own beams 42. Thus there are four compartments 34 one above the other and the preferred rack has 25 compartments at each level making the total number of compartments in the storage rack 100.

Referring again to FIG. 5, there are square tubes 50 welded to the upper ends of the flanges 36; and there are guide plates 52 secured to the top surfaces of the tubes 50. The guide plates 52 on opposite sides of each of the bobbins 18 has a small clearance from the bobbin flanges 40 when the bobbins are centered on the bobbin tracks. There are preferably circumferential lips 54 extending outwardly from the circumferences of the bobbin flanges 40 so that the guide plates 52 have little more than point contact with the curved lips 54.

When a bobbin 18, rolling along its track, drifts toward one side of the track and the flange lip 54 contacts with the guide plate 52, this contact turns the bobbin away from the guide plate and back toward the center of the track.

In order to reduce to a minimum the friction between the bobbins and the guide plates 52, the area of surface contact is kept very small by having the height of the guide plates 52 small and by having the flanges formed with the lips 54 so that these lips are the only part of the flanges that have friction contact with the guide plates.

The guiding is also facilitated by having the guide plates at a height above the plane surfaces of the tracks on which the bobbins roll. The reaction force tending to turn the bobbin away from the guide plates is at a maximum if the guide plates are above the track surface by a distance equal to the radius of the bobbin. It is, however, not necessary to have the guide plates that high. Almost three quarters of the maximum turning reaction can be obtained if the height of the guide plates 52 is above the flanges 38 by a distance equal to half the radius of the bobbins. The bobbin track construction for one compartment is similar to the construction of the bobbin tracks 12a, 14a and 16a of FIG. 2.

The inventory storage rack 32 provides for the storage of numerous bobbins wound with wire of the various colors that are to be used for color coding the pairs which are used to make the communication cable. The bobbins are removed from the right hand end of the rack (FIG. 2) by a hoist for delivery to a pairing station.

When empty bobbins from the pairing station are to be returned to the wire making section 10, they are removed from the conveyor 58 and put on another bobbin track 60 which slopes downwardly toward the elevator track 26. A stop 64 illustrated diagrammatically in FIG. 2, holds the empty bobbins on the track 62 until the elevator 22 is brought into position to receive them. The elevator 22 then moves along its tracks 26 into alignment with other return bobbin tracks 66 running parallel to the respective first bobbin tracks 12a, 14a and 16a. These return tracks 66 slope downwardly toward the wire making section 10 and return the empty spools to that section for reuse.

FIG. 3 shows the elevator carriage 24 supported from the tracks 26 by flanged wheels 70. There is a rigid structure 72 secured to the carriage 24 and a part of this rigid structure 72 is an elevator shaft 74. This shaft 74 guides the elevator 22 as it moves up and down with respect to the carriage 24 to bring the elevator into alignment the different levels of the inventory storage rack. Hoist mechanism 76 is located at the top of the shaft 74 for raising and lowering the elevator. Electric power for the hoist 76 and for the traction motor of the carriage 24 can be supplied by a contact shoe on the carriage running along a stationary conductor rail parallel to the track 26. This power supply structure is not illustrated since it is a well known and conventional expedient for transmitting electric power from a stationary source to a moving carriage that operates along the track. FIG. 4 shows a traction motor 73 which drives an axle 75 through transmission gearing 76.

The elevator 22 has guide rollers 78 that run against the sides of the shaft 74 for making the elevator move in a vertical direction without substantial side sway.

The elevator 22 is raised and lowered, with respect to the shaftway 74 by roller chains which are connected with the floor of the elevator through connections 86. These connections permit pivotal movement of the elevator with respect to the hoisting connections. The chains 80, which are representative of flexible tension elements for lifting the elevator, wrap around drums 88 in housings 90 at the top of the frame 72. These drums 88 are rotated through gearing in the housings 90 by a drive shaft 92 that turns in bearings 94 and that has various couplings 96 at spaced locations along the composite shaft 92.

The drive shaft 92 is rotated by a motor 98 through gearing 100.

The portions of the composite shaft 92 which drives the drums 88 are connected with one another through a differential gearing 102. A motor 104, located behind the differential gearing 102 in FIG. 4, operates the differential 102 to change the phase relation between the drums 88.

Operating the differential gearing 102 in one direction changes the phase relation of the drums 88 so that one side of the elevator is lower than the other. This means that the elevator will slope downwardly at its right hand side in FIG. 4. Rotation of the differential gearing 102 in the other direction changes the phase relation of the drums 88 so that the right hand end of the elevator is higher than the left hand end and the elevator slopes downward toward the left. Thus the slope of the elevator can be changed to cause bobbins to roll one way or the other depending upon which bobbin tracks the elevator is cooperating with to transfer bobbins to or from the respective tracks.

The chute 28 is connected with the rest of the elevator by a shaft 108 about which the chute can pivot into an upwardly extending position as indicated by the broken lines in FIG. 4.

The chute 28 is raised and lowered by a hoisting chain 110 that passes over a sprocket 112 rotated by a motor 114 through a gear box 116. When the chute 28 is in its broken line position, it serves as a stop to prevent bobbins 18 from rolling off the bobbin track of the elevator at the left hand end of the elevator as viewed in FIG. 4.

There is another chute 118 on the other side of the elevator which is hoisted into the broken line position by a hoisting chain 120 which passes over a sprocket 122. This sprocket is driven by a motor 124 through a gear box 126 similar to the chute hoisting apparatus on the other side of the elevator. When the chute 118 is in raised position it serves as a stop for preventing bobbins 18 from rolling off the elevator bobbin track at the right hand side of the elevator.

The stop 20 at the end of the bobbin track 14a prevents bobbins from rolling off the track 14a until the elevator chute 28 comes down on the end portion of the track 14a and displaces an abutment 132 from the dotted line position shown in FIG. 4 to the full line position. This abutment 132 is on a lever 134 by which the stop 130 is carried and the depression of the abutment 132 rocks the lever 134 about its pivot 136 to carry the stop 130 downwardly below the track 14a so that bobbins can roll freely from the track. A spring 140 restores the abutment 132 and the stop 130 to their operative positions whenever the weight of the chute 28 is lifted from the abutment 132. This construction is merely representative of means for stopping the bobbins from rolling off the track 14a and for rendering the stop means inoperative when the chute 28 comes into position to receive bobbins from the track 14a.

FIG. 6 shows a top plan view of the chute 28. A shaft 146 extends under the chute 28 and has a collar 148 at each end in position for connecting with the hoist chains 116. Coiled tension springs 150 are interposed between the collars 148 and the hoist chains 116 to provide some resilience in the chute hoisting means.

FIG. 6 shows the chains 116 passing over sprockets 112 and then passing downward into square tubes 154 attached to the frame of the elevator. Weights can be used on the ends of the chains in the square tubes 154 to hold the chains firmly against the sprockets 112.

The sprockets 112 are on opposite ends of a drive shaft 158 to which motion is supplied from the reduction gearing 116 through a sprocket 160, on the outlet shaft of the reduction gearing, through a chain 162 and a sprocket 164 on the drive shaft 158. This shaft 158 rotates in bearings 170 attached to the frame of the elevator.

FIG. 8 shows a console 176 which extends upwardly from the top surface of the carriage 24. There is a platform area 178 in front of the console 176 for an operator 180. The operator manipulates controls 182 on a face of the console 176. These controls operate the movement of the carriage 24 along the track 26 and the operation of the elevator 22. They also control the tilting of the elevator floor and the operation of the chutes that can be lowered to put the elevator track 30 in contact with the bobbin track 14a on the other bobbin tracks; and also for operating the chute 118 to put it in contact with bobbin tracks including those in the inventory storage rack compartments. All of the manual controls for the carriage 24, the elevator 22 and the various movable parts of the elevator are controlled from the console 176.

The operator manipulates the manual controls to bring the carriage into a position where the elevator chutes 28 and 118 are in the vicinity of the bobbin track 14a for the compartments of the inventory storage rack, or other bobbin tracks to or from which bobbin transfers are to be made. The operator then releases the manual control and permits an electronic control to take over.

The electronic control includes a photocell 184 secured to one side of the carriage 24. This photocell 184 projects a beam of light 186 which strikes a reflector 188 on one end of the bobbin track 14a when the elevator 22 is in alignment with the bobbin track 14a. When this position of alignment is reached a motor control responsive to the photocell 184 stops further movement of the carriage 24. This structure and its circuits are not shown in FIG. 8 since such controls are well known and no detailed description of it is necessary for a complete understanding of this invention.

A similar photocell 184' is located on the other side of the carriage for cooperation with a reflector 188' at the center of one of the inventory storage rack compartments 34.

The operator controls the up and down movement of the elevator 22 so as to bring the elevator within the vicinity of the particular compartment of the storage rack to which bobbins are to be supplied or from which bobbins are to be removed. The photocell 184' aligns the elevator with a particular column of storage racks and there is a similar photocell on the elevator which cooperates with reflectors on the storage racks at each level for stopping the elevator when it reaches the carriage height for alignment with the intended compartment. As the elevator goes up, the operator must maintain control until the elevator photocell on the elevator has passed the reflector for the compartment below the one with which the elevator is to be aligned. Manual controls are then operated to bring the elevator under the control of the electronic control means and the elevator will stop as soon as its photocell receives a reflection from the next reflector of the inventory storage rack.

Some of the controls on the console 176 are indicated by the reference character 182 and this designation applies to all of the controls even though reference lines do not extend to all of them. Likewise, there are circuits 192 leading to and from the controls 182 for opening and closing circuits as necessary to operate motors and other various devices which are controlled by the operator through the console 176. The circuits 192 are shown entering a duct 194 which extends to the various motors and other elements to be controlled.

Electric power to the console 176 can be supplied through a third rail 196 which is shown as extending along the floor between the track rails 26. There is a contact shoe 198 on the carriage in position to contact with the third rail 196. The third rail may have such shielding as necessary for safety. This construction is merely representative of means for conveying electricity from a stationery supply source to a moving vehicle and such constructions are well understood in the electrical art.

FIGS. 3 and 8 show the carriage 24 equipped with bumpers 200 at both ends of the carriage and extending for some distance beyond the carriage. These bumpers extend across the track 26 and close to the surface of the track so as to detect any obstruction on the track or in the path of movement of the carriage 24 and the parts of the elevator which extend beyond the sides of the carriage. If either of the bumpers 200 encounters an obstruction, the pressure against the bumper can be used to stop further movement of the carriage and/or to sound an alarm.

The preferred embodiment of the invention has been illustrated and described, but changes and modifications can be made and some features can be used in different combinations without departing from the invention as defined in the claims.

What is claimed is:

1. A wire transport system for a communication cable manufacturing facility in which wire is wound on bobbins having flanges on both sides thereof and on which the bobbins roll from one location to another, including in combination a number of machines for making insulated wires with different color coding and winding the wire on successive bobbins, a first set of tracks including one for receiving successive bobbins from each machine, each of the tracks being of a length to receive and accumulate a plurality of bobbins from its machine and which are wrapped with wire of the same color coding, a second set of tracks extending generally parallel to the first set of tracks and at substantially the same level as the first set of tracks and horizontally spaced therefrom, tracks of the first set sloping downward toward one end thereof, and tracks of the second set sloping downward toward the opposite end thereof, whereby the bobbins roll by gravity along the tracks in different directions toward or from each of the machines for making the insulated wires, a carriage track extending transversely of the bobbin tracks at the ends of the bobbin tracks remote from the machines, an inventory storage rack having a plurality of bobbin holding compartments at spaced locations in a row on a common level along the length of the carriage track, said inventory storage rack having a plurality of rows of similar bobbin holding compartments at successively higher levels above the level of the carriage track, an elevator with a track for receiving bobbins selectively from each of the first bobbin tracks, the elevator having supporting surfaces on which the bobbin flanges roll on and off the elevator, from the first and second set of tracks, respectively, means for bringing empty bobbins back to the elevator for delivery to said second track for return to the machines for rewinding, guide surfaces along the tracks for maintaining the bobbin flanges in substantial alignment with the tracks on which the bobbins roll, a shaftway in which the elevator travels up and down, and a carriage on which the elevator shaftway and elevator are supported for movement as a unit with the carriage along the carriage track, the elevator being movable successively into line with the first and second bobbin tracks of any of the machines and then into alignment with any compartment for storing bobbins with wire of the same color coding in the same compartment of the inventory storage rack.

2. The wire transport system described in claim 1 characterized by each of the first bobbin tracks having its downstream or delivery end near the carriage track, and each of the second bobbin tracks having its upstream or receiving end near the carriage track, but at locations such that there is space between the ends of the bobbin tracks and the elevator when the elevator stops in line with the respective bobbin tracks, a chute that spans said space between the bobbin tracks and the elevator and that is connected with one of them by a pivot connection about which the chute swings into a position to provide clearance for the elevator to travel past the ends of the bobbin tracks, and surfaces on the chute on which the flanges of the bobbins roll.

3. The wire transport system described in claim 2 characterized by the chute being connected with the elevator and being long enough to reach the end of each bobbin track when the elevator is in line with each of the bobbin tracks, a movable stop adjacent to the delivery end of each bobbin track for preventing bobbins from rolling off the end of the bobbin track, and automatic means, operated by the lowering of the chute into line with each first bobbin track, for moving the stop at the delivery end thereof into inoperative position whereby the flanges of the bobbins on each first bobbin track roll off each first bobbin track and across said chute to the elevator.

4. The wire transport system described in claim 1 characterized by each of the first bobbin tracks having a length sufficient to store a predetermined number of bobbins, wound with wire of the same color coding, on said first bobbin track that leads from each machine, the elevator having a bobbin track thereon which moves into line with each of the first bobbin tracks when the elevator is in line therewith, the bobbin track on the elevator being of a length sufficient to hold the same number of bobbins as are stored on any one of the first bobbin tracks whereby the elevator can remove all of the stored bobbins from any of the machines and transport them simultaneously on the elevator bobbin track to a compartment of the inventory storage rack.

5. The wire transport system described in claim 4 characterized by the compartments of the inventory storage rack being of a length to receive the full supply of bobbins carried by the elevator, whereby one trip of the elevator delivers all of the bobbins stored on one of the first bobbin tracks to one of the compartments of the inventory storage rack in a single trip.

6. The wire transport system described in claim 1 characterized by the inventory storage rack being on the opposite side of the carriage track from the first bobbin tracks, a bobbin track on the elevator which moves into line successively with one of the first bobbin tracks and then with a compartment of the inventory storage rack, and chutes at opposite ends of the elevator bobbin track, said chutes being movable into position to connect the elevator bobbin track with a selected one of the first bobbin tracks and with one of the inventory storage compartments, respectively.

7. The wire transport system described in claim 6 characterized by the chutes at the opposite ends of the elevator bobbin track being connected with the elevator by pivot connections about which the chutes swing upwardly into position to provide stops at both ends of the elevator bobbin track for preventing the bobbins from rolling off each end of the elevator bobbin track while the elevator is in motion.

8. The wire transport system described in claim 1 characterized by each of the first bobbin tracks having a slope downward toward the carriage track so that bobbins on each of the first bobbin tracks tend to roll on that track toward the carriage track and toward the elevator which moves along the carriage track into alignment with a selected first bobbin track, a floor of the elevator for supporting bobbins on the elevator, said floor having a slope for causing bobbins to roll off the elevator when the elevator is in position to deliver bobbins at a preselected location.

9. The wire transport system described in claim 1 characterized by the elevator being movable into line with the second bobbin track for delivering empty bobbins thereto, the elevator having a floor on which bobbins are supported while on the elevator, and means for changing the slope of the elevator floor to slope the floor downwardly away from the first bobbin track and downwardly toward the second bobbin track when the elevator is stopped at the respective bobbin tracks whereby the bobbins on the elevator roll by gravity in the same direction as the bobbins roll on the respective bobbin tracks.

10. The wire transport system described in claim 1 characterized by the carriage having a control console thereon with manual controls, a platform on the carriage for an operator located in front of the console in position to operate the controls thereon, electrical conductors connecting the controls on the console with fixed conductors with respect to which the carriage is movable.

11. The wire transport system described in claim 10 characterized by manual control means by which the operator controls the movement of the carriage along its track to the vicinity of a bobbin track or inventory storage compartment, and electronic control means that take over the control of the movement and stopping of the carriage to bring the carriage into final alignment with the bobbin track or storage compartment into the vicinity of which the operator has brought the elevator and the carriage by said manual control.

12. The wire transport system described in claim 11 characterized by the electronic control means including photocell elements and reflector elements, one of which is on the carriage and the other of which is at a fixed location lengthwise of the carriage track whereby the photocell and reflector align with one another when the carriage is at a location where it is to be stopped in alignment with a bobbin track or storage compartment.

13. The wire transport system described in claim 12 characterized by the elevator supporting surfaces including a bobbin track that moves into alignment with one of the bobbin tracks from which bobbins are to be received or delivered by the elevator, the bobbin track on the elevator being longer than the width of the elevator and longer than the tread of the tracks on which the elevator carriage runs whereby the elevator bobbin track reaches beyond the elevator and carriage track at both sides thereof.

14. The wire transport system described in claim 13 characterized by the elevator bobbin track being also longer than the width of the shaftway, the shaftway having open, unobstructed space at both sides thereof through which the elevator bobbin track extends, and said openings having sufficient clearance above the elevator bobbin track for the passage of bobbins along the elevator bobbin track from locations within the shaftway to locations outside the shaftway.

15. The wire transport system described in claim 12 characterized by the elevator having a floor with a bobbin supporting surface, supporting means at a first side of the elevator floor on which the floor has pivotal movement about an axis extending parallel to the direction of movement of the elevator carriage, and means for selectively lifting and lowering the other side of the elevator floor with respect to the first side to give the elevator floor a slope downward away from one of the first bobbin tracks or downwardly toward one of the second bobbin tracks depending upon whether bobbins are to be rolled from one of the first bobbin tracks onto the elevator or rolled from the elevator onto one of the second bobbin tracks.

16. The wire transport system described in claim 15 characterized by the elevator floor having flexible hoisting means at both sides thereof, drums about which the flexible supporting means wind to raise the elevator floor, motion transmitting mechanism for turning the drums including a differential located between the drums, a motor that operates the drums, the means for lifting and lowering said other side of the elevator floor including structure for operating the differential gearing to change the phase angle of one drum with respect to the other selectively clockwise or counter-clockwise to lift or lower said other side of the elevator with respect to said first side to reverse the direction of slope of the elevator floor.

17. The wire transport system described in claim 11 characterized by electronic control means for stopping the elevator in exact alignment with the storage compartments of the inventory storage rack including the different levels of the rack after the operator has brought the elevator into the vicinity of a compartment by means of the manual control on the console.

18. The wire transport system described in claim 1 characterized by a third bobbin track on the opposite side of the elevator carriage track from the first and second bobbin tracks, the elevator having a chute thereon which reaches to the third bobbin track when the elevator is in alignment therewith whereby returning bobbins from the third bobbin track roll across the chutes and onto the elevator for delivery to the second bobbin track.

19. The wire transport system described in claim 1 characterized by the bobbins having flanges at opposite sides thereof, and the bobbin track having an underlying surface on which the flanges roll, and guides above the level of the underlying surface in position to contact with the flanges of the bobbin to maintain the bobbins in substantial alignment with the track as they roll along the track.

20. The wire transport system described in claim 1 characterized by the track along which the carriage travels being equi-distant from the ends of the different compartments in the storage rack at which bobbins are inserted into said compartments, and bumpers at both ends of the carriage and extending across the full width of the carriage and the carriage track, said bumpers extending down to a level close to the track to detect obstructions on the track and in the path of the carriage, and resilient connections between the bumper and the carriage.

21. A wire transport system for a communication cable manufacturing facility in which wire is wound on bobbins having flanges on both sides thereof and on which the bobbins roll from one location to another, including in combination a number of machines for making insulated wires with different color coding and winding the wire on successive bobbins, a first set of tracks including one for receiving successive bobbins from each machine, each of the tracks being of a length to receive and accumulate a plurality of bobbins from its machine and which are wrapped with wire of the same color coding, a carriage track extending transversely of the bobbin tracks at the downstream end of the bobbin tracks, an inventory storage rack having a plurality of bobbin holding compartments at spaced locations in a row on a common level along the length of the carriage track, said inventory storage rack having a plurality of rows of similar bobbin holding compartments at successively higher levels above the level of the carriage track, an elevator with a track for receiving bobbins selectively from each of the first bobbin tracks, the elevator having supporting surfaces on which the bobbin flanges roll on and off the elevator guide surfaces along the track for maintaining the bobbin flanges in substantial alignment with the tracks on which the bobbins roll, a shaftway in which the elevator travels up and down, and a carriage on which the elevator shaftway and elevator are supported for movement as a unit with the carriage along the carriage track, the elevator being movable successively into line with the bobbin track from any of the machines and then into alignment with any compartment for storing bobbins with wire of the same color coding in the same compartment of the inventory rack, and further characterized by the bobbins having flanges at opposite sides thereof, and the bobbin track having an underlying surface on which the flanges roll, and guides above the level of the underlying surface in position to contact with the flanges of the bobbin to maintain the bobbins in substantial alignment with the track as they roll along the track, the guides comprising thin strips extending lengthwise of the bobbin track and with edge portions of the strips extending inward toward the flanges of the bobbin in position to contact with the bobbin flanges at a distance above said underlying surface equal to at least one half of the radius of the bobbin flanges.

22. The wire transport system described in claim 21 characterized by the flanges of the bobbins having circumferential edges that curve outwardly from the flanges around the full circumference of each flange, the guide strips on opposite sides of the bobbin track having their confronting edges spaced from one another by a distance slightly greater than the width of the bobbins as measured across the outside of the outwardly curved circumferential edges so that the bobbin flanges contact with the edges of the strips whenever a bobbin drifts to either side of a center position on the track, the areas of the contact of the edges of the strips with the edges of the flanges being substantially point contact to reduce to a minimum the friction between the moving bobbin flanges and the stationery guide strips.

* * * * *